(No Model.) 2 Sheets—Sheet 1.

W. F. MAIN.
MUSIC BOX.

No. 559,183. Patented Apr. 28, 1896.

Witnesses
Inventor
Willard F. Main
by Foster & Freeman Attorneys (No Model.) 2 Sheets—Sheet 2.
W. F. MAIN.
MUSIC BOX.
No. 559,183. Patented Apr. 28, 1896.
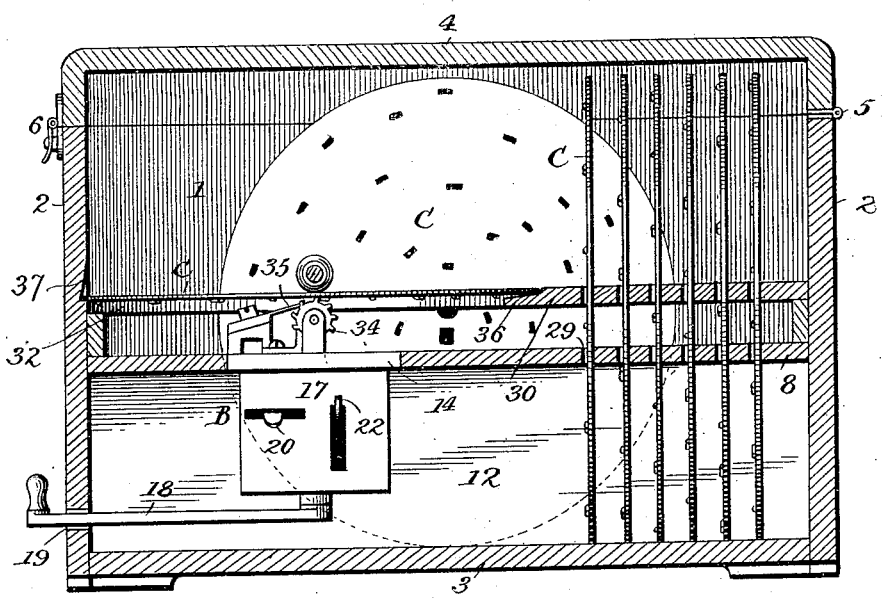

UNITED STATES PATENT OFFICE.

WILLARD F. MAIN, OF IOWA CITY, IOWA.

MUSIC-BOX.

SPECIFICATION forming part of Letters Patent No. 559,183, dated April 28, 1896.

Application filed June 24, 1895. Serial No. 553,786. (No model.)

*To all whom it may concern:*

Be it known that I, WILLARD F. MAIN, a citizen of the United States, residing at Iowa City, in the county of Johnson and State of Iowa, have invented certain new and useful Improvements in Music-Boxes, of which the following is a specification.

My invention has more particular relation to those music-boxes wherein the required sounds are produced by means of perforated disks or disks having annular series of projections in their faces to actuate the keys or sounding-teeth; and it is the object of the invention to provide a compact and conveniently-arranged casing for containing the sounding mechanism and one in which any desired number of pattern-disks may be disposed in such manner that any one of them will be readily accessible to the operator.

With these objects in view the invention consists in the peculiar construction and arrangement of parts hereinafter more fully described, and particularly pointed out in the claims.

Figure 1:
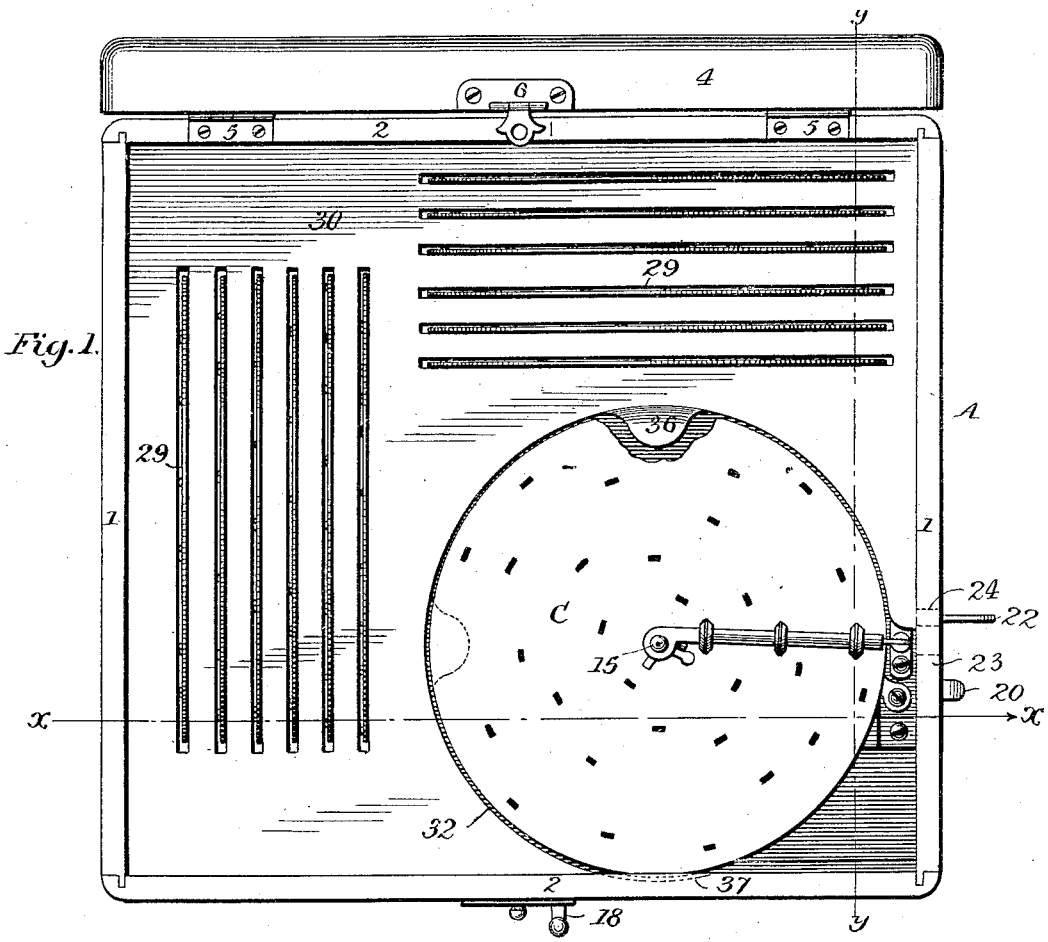
Figure 2:
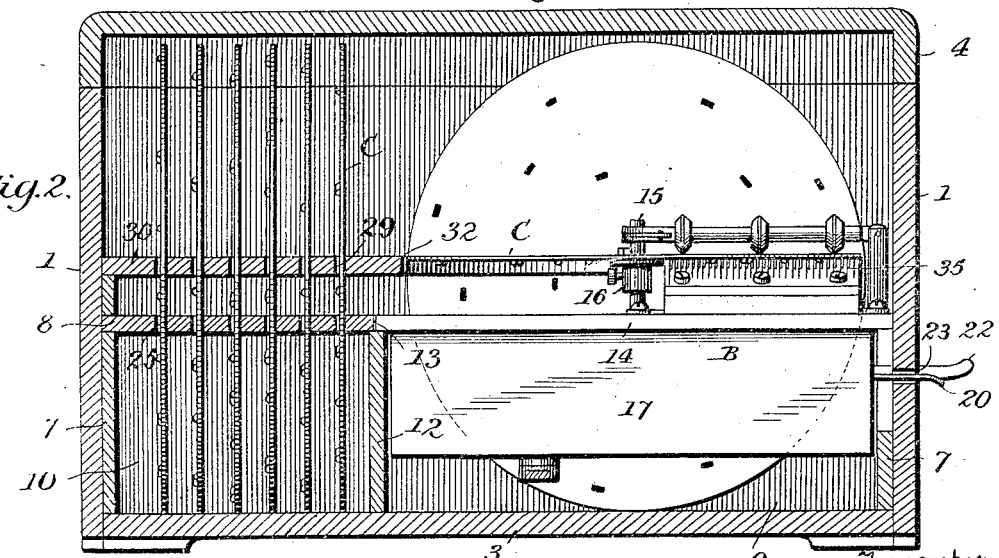

In the accompanying drawings, forming part of this specification, and in which like letters and numerals of reference indicate corresponding parts, Figure 1 is a plan view of the invention. Fig. 2 is a sectional view on the line $x\,x$ of Fig. 1, and Fig. 3 is a sectional view on the line $y\,y$ of Fig. 1. Figs. 4 and 5 are plan views of modifications of the upper partition.

Referring to the drawings, A represents the inclosing casing, preferably rectangular in shape and comprising the sides 1 1, ends 2 2, bottom 3, and lid 4. The lid is hinged to the inclosing casing at 5 and is provided with a suitable fastening device 6 for securing it when closed.

The sides of the inclosing casing A are provided with battens or strips 7, upon which is supported a partition 8, extending horizontally across the inclosing casing about midway between the top and bottom thereof, thereby forming a space between said partition and the bottom of the casing. This space is divided into two compartments 9 10 by means of a vertical partition 12 extending from the bottom 3 to the under face of the partition 8. This latter partition is provided with an opening 13 for reception of the supporting-plate 14 of the sounding mechanism B, said plate being supported at its opposite ends by the vertical partition 12 and one of the battens or strips 7. No claim is made herein to the specific construction of the sounding mechanism, and hence it is not thought necessary to more than briefly describe it.

Extending vertically above the supporting-plate 14 is a shaft 15, having a collar 16 near its end. This shaft is rotated by a spring or other motor within a case 17 below the plate 14, the actuating-spring of the motor (not shown) being wound by means of an arm 18, projecting through a slot 19 in the front end of the inclosing casing A. Devices 20 22 for stopping and starting the spring-motor and for controlling the speed tnereof project from the case 17 through slots 23 and 24 in one side of the inclosing casing.

Within the partition 8 are a number of separated and parallel slots 25, arranged in any desired manner. These slots, as shown, are divided into two series, one of which is arranged parallel to one side of the inclosing casing and the other at right angles to the first series and parallel to one end of the casing A. These slots coincide with similar slots 29 in a partition 30, arranged above and parallel to the partition 8 to leave a space between them, and serve as holders for a series of pattern-disks C, having projecting portions upon their faces. The disks C pass through the coinciding slots 29 and 25 in the partitions 30 and 8, respectively, and rest at their edges upon the bottom 3 of the inclosing casing A. The diameter of these disks is less than the height of the inclosing casing A and they are entirely inclosed within said casing when the lid 4 is closed.

It will be understood, of course, that the slots 25 and 29 are of slightly greater length and width than the diameter and thickness of the disks C, respectively, in order that said disks may be readily inserted or withdrawn therefrom without bending or otherwise injuring the same.

It will be understood also that by separating the slots 29 and 25 and arranging them parallel the disks C are readily accessible and any one of them may be removed without necessitating moving or handling the others.

The upper partition 30 is provided with a recess 32 of greater diameter than the pattern-disks C. This recess, as shown in Fig. 1, may be in the arc of a circle, or, as illustrated in Figs. 4 and 5, it may be a circular opening, and its edge is provided with one or more projections or bearings 36. The shaft 15 of the sounding mechanism projects centrally through the recess 32 and is adapted to pass through a central opening in the pattern-disks C, which are caused to turn with said shaft to bring the projections on said disks successively into engagement with a series of star-wheels 34 to turn the same. These star-wheels are arranged in such relation to the teeth or keys 35 of the sounding devices that as they are turned their points will come in contact with said teeth or keys and they will be operated.

When one of the pattern-disks C is adjusted in position upon the shaft 15, its edge rests upon a bearing portion 36, projecting from the edge of the recess 32, and upon the bottom of a recess 37, formed in one end of the inclosing casing. The purpose of the bearings formed by the projection 36 and recess 37 is to hold the pattern-disks always in a horizontal plane and prevent sagging of the edge of said disks. This, as will be readily understood, insures a uniform engagement of the projections on the pattern-disks C with the sounding teeth or keys 35.

It will be understood, of course, that instead of the edge of the recess or opening 32 being provided with only one projecting bearing portion any number may be employed, the opening in the modification illustrated by Fig. 4 being provided with four bearing portions 36.

In the modification of the upper partition 8 illustrated in Fig. 5 of the drawings, instead of providing said partition with series of slots two rectangular openings 29ª are formed, the opposite edges of said openings being provided with recesses 29ᵇ, into which are received the edges of the pattern-disks C. By this arrangement all liability of the projections on the pattern-disks being bent by coming in contact with the sides of the slots is avoided.

What I claim is—

1. A music-box comprising a casing, a partition arranged in said casing provided with a recess, bearings on the edge of said recess, a shaft projecting centrally through the recess, means for rotating the shaft, a pattern-disk adapted to be carried upon the shaft, and sounding mechanism actuated by the pattern-disk, substantially as described.

2. A music-box comprising a casing, and a partition arranged intermediate the top and bottom of said casing, and provided with a recess and with a series of parallel slots, substantially as described.

3. A music-box comprising a casing, a partition arranged intermediate the top and bottom of said casing and provided with a recess and with a series of parallel slots, and bearings at the edge of said recess, substantially as described.

4. A music-box comprising a casing, an upper partition arranged intermediate the top and bottom of said casing, and provided with a series of parallel slots, and a lower partition arranged intermediate the upper partition and the bottom of the casing, and provided with a series of parallel slots coinciding with those in the said upper partition, substantially as described.

5. A music-box comprising a casing, a partition arranged in said casing, a shaft projecting through the partition, means within the casing for rotating the shaft, a pattern-disk adapted to be carried upon the shaft, sounding mechanism actuated by the pattern-disk, and a series of parallel slots formed in the partition adjacent to the disk being actuated for holding additional pattern-disks, substantially as described.

In testimony whereof I have signed my name to this specification in the presence of two subscribing witnesses.

WILLARD F. MAIN.

Witnesses:
A. C. HOWELL,
M. F. PRICE.